Patented Feb. 4, 1936

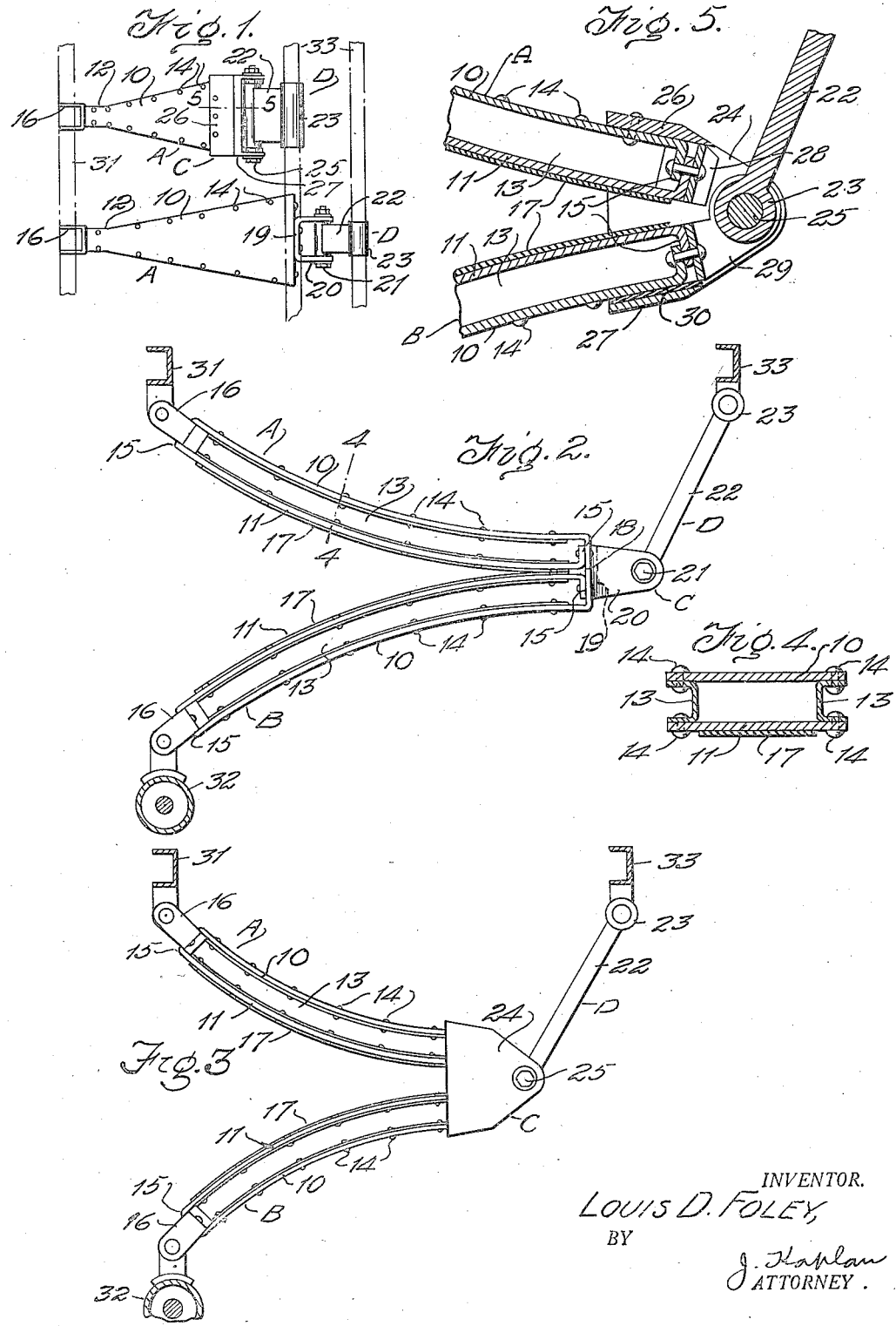

2,029,472

UNITED STATES PATENT OFFICE 2,029,472

SPRING FOR VEHICLES

Louis D. Foley, Louisville, Ky.

Application May 31, 1935, Serial No. 24,430

19 Claims. (Cl. 267—36)

This invention relates to springs and has special reference to springs for vehicles such as automobiles, airplanes, trains, wagons and the like.

One important object of the invention is to provide an improved general construction of spring especially adapted to support a vehicle body against the road shocks sustained by the wheels and their associated parts forming the under-carriage of the vehicle.

A second important object of the invention is to provide an improved construction for springs designed to act as shock absorbers and to resist excessive movement of the vehicle body both upwardly and downwardly, the springs acting in conjunction with the supporting springs which absorb shocks of normal intensity.

A third important object of the invention is to provide an improved form of spring so designed that the metal of the spring parts is distributed in such manner as to produce a structure of great lightness with increase of strength over the usual spring construction.

A fourth important object of the invention is to provide a leaf spring of novel construction wherein the leaves are of uniform strength throughout their lengths.

A fifth important object of the invention is to provide a novel form of spring so constructed that the usual problems of manufacture and installation are greatly simplified and the mechanical work of installation is reduced.

A sixth important object of the invention is to provide a novel construction of leaf spring wherein friction between the leaves of the spring is eliminated thus prolonging the effective life of the spring and avoiding squeaking and the necessity of oiling between the leaves.

A seventh important object of the invention is to provide a novel construction of spring designed to eliminate interference in body design, to permit the rear wheels of the vehicle to be located well to the rear of the body and a rear seat therein or the body to be shortened while maintaining the same wheel base, and to eliminate interference with turning the front wheels in steering.

With the above and other objects in view, the invention consists in general of certain novel details of construction and combinations of parts hereinafter fully described, illustrated in the accompanying drawing and specifically claimed.

In the accompanying drawing like characters of reference indicate like parts in the several views, and:—

Figure 1 is a diagrammatic plan view showing both forms of the spring applied to a vehicle.

Figure 2 is a side elevation of the spring as designed for the absorption of the usual road shocks.

Figure 3 is a side elevation of the spring as designed to aid the spring of Figure 2 upon extraordinary road shocks occurring.

Figure 4 is a detail cross section through one arm of such springs, the section being taken on the line 4—4 of Figure 2.

Figure 5 is a detail vertical section to an enlarged scale on the line 5—5 of Figure 1.

In the embodiments of the invention as shown in the accompanying drawing each complete spring consists in general of four parts, an upper arm A, a lower arm B, a yoke C and a hanger D. In each of the forms shown the arms A and B extend in the same general direction from the yoke C and diverge from each other along curved lines, the upper arm A curving upwardly from the yoke and the lower arm B curving downwardly from the yoke. These arms may thus be said to be divergingly arcuate.

In both forms of the invention each arm consists of a pair of spaced spring metal plates 10 and 11, the plate 10 being on the concave or outer side of the arm and the plate 11 on the convex or inner side of the arm. These plates taper to decrease in width from the ends adjacent the yoke to points adjacent their other ends, the extremities 12 of the plates at the ends remote from the yoke being of uniform width. The two plates of each arm are held in spaced relation by channels 13 extending between the side edge portions of the plates and there secured by rivets 14 or any other suitable means such as bolting or welding. At the end of each arm the plates 10 and 11 project longitudinally beyond the channels 13 and are bent inwardly of the arm to lie in overlapping relation as at 15 and are there secured as by suitable rivets. A fork 16 is fixed to the end of each arm remote from the yoke. A bumper strip 17 of rubber or other elastic material is secured to the convex face of each plate 11 so that, in the event that the arms contact under severe stresses, such contact will not result in clashing noises and, moreover, the elastic material will, under such conditions, act to aid the springs.

Since the supporting springs of a vehicle are under stress at practically all times, whether the vehicle is or is not in motion it is necessary to connect the two arms of a supporting spring of this kind in a substantially fixed manner and, as shown in Figure 2 this may be done by forming the plates 10 integrally so that the ends of these plates adjacent the yoke are connected integrally as at 18. In this form of the spring the yoke consists of a base 19 fixed to the part 18 and having parallel arms 20 suitably perforated to receive a pivot bolt 21. The hanger D consists of a shank 22 having a tubular head 23 at each end. In the form used for ordinary service, this hanger has its lower end mounted on the pivot bolt 21.

In the form of spring used to absorb abnormal shocks (see Fig. 5) the yoke C is differently constructed. In this form the yoke is constructed with a pair of spaced sides 24 of somewhat triangular form and having a pivot bolt 25 extending between them adjacent the apex of such triangle. These sides have their tops connected by a transverse member 26 and their bottoms connected by a similar transverse member 27. The upper arm A is fixed at its yoke end to the member 26 and also to a bracket 28 secured to the sides 24. The lower arm B has a fork member 29 fixed to its yoke end and pivoted on the bolt 25 so that this lower arm can swing freely on the bolt between a position of engagement with the upper arm to a position of engagement with the member 27. In this case the hanger, as before, has its lower end mounted on the bolt 25 to afford pivotal motion to the hanger. A cushion strip 30 is provided between the arm B and the member 27.

In use the upper arm has the fork connected to a part of the vehicle body such as a cross-frame member 31 and the lower arm is similarly connected to a part of the under-carriage such as the axle 32. Also the upper end of the hanger is connected to a part of the vehicle body such as the cross-frame member 33.

Under ordinary running conditions the road shocks are cushioned entirely by the action of the suspension springs since the lower arm B of the spring for abnormal shocks oscillates on the pin 25 without engaging either the upper arm or the member 27. However, if a shock is given the vehicle wheels sufficient to throw them upwardly to such an extent that the lower arm engages the upper arm any further movement will not only be resisted by the suspension spring but also by the second or shock absorbing spring. Similarly, if the vehicle wheel passes over a hole in the road sufficiently deep to allow the lower arm to drop far enough to bring it in contact with the member 27 both springs will resist further movement.

There has thus been provided simple and efficient devices of the kind described and for the purpose specified.

It is obvious that changes may be made in the form and construction of the invention without departing from the principles involved therein. It is not, therefore, desired to confine the invention to the exact form herein shown and described but it is desired to include all forms which come within the scope of the appended claims.

What is claimed is:

1. In a spring of the kind described, a spring member comprising an upper elongated plate of spring metal, a lower elongated plate of spring metal, and a pair of channel bars extending along the said plates and secured thereto to hold said plates in spaced relation.

2. In a spring of the kind described, a spring member comprising an upper elongated plate of spring metal, a lower elongated plate of spring metal, and a pair of channel bars extending along the said plates and secured thereto to hold said plates in spaced relation, said plates tapering in width to provide a wide end and a narrow end for each plate.

3. In a spring of the kind described, a spring member comprising an upper elongated plate of spring metal, a lower elongated plate of spring metal, and a pair of channel bars extending along the said plates and secured thereto to hold said plates in spaced relation, said plates having their ends extending beyond the channels with the ends of each plate extending towards the other plate, said ends being secured in overlapping relation.

4. In a spring of the kind described, a spring member comprising an upper elongated plate of spring metal, a lower elongated plate of spring metal, and a pair of channel bars extending along the said plates and secured thereto to hold said plates in spaced relation, said plates tapering in width to provide a wide end and a narrow end for each plate, said plates having their ends extending beyond the channels with the ends of each plate extending towards the other plate, said ends being secured in overlapping relation.

5. A spring device including a yoke, and a pair of elongated box-like spring members each having an end supported by yoke and extending therefrom in arcuately diverging relation with their convex sides confronting.

6. A spring device including a yoke, a pair of elongated box-like spring members each having an end supported by yoke and extending therefrom in arcuately diverging relation with their convex sides confronting, and an elastic cushion strip extending along the concave side of at least one of said spring members.

7. A spring device including a yoke, and a pair of elongated box-like spring members each having an end supported by yoke and extending therefrom in arcuately diverging relation with their convex sides confronting, each of said members consisting of an inner plate and an outer plate of spring metal and a pair of spaced channels extending along the plates and fixedly secured between said plates.

8. A spring device including a yoke, and a pair of elongated box-like spring members each having an end supported by yoke and extending therefrom in arcuately diverging relation with their convex sides confronting, each of said members consisting of an inner plate and an outer plate of spring metal and a pair of spaced channels extending along the plates and fixedly secured between said plates, said plates tapering in width to provide a wide end and a narrow end for each plate.

9. A spring device including a yoke, and a pair of elongated box-like spring members each having an end supported by yoke and extending therefrom in arcuately diverging relation with their convex sides confronting, each of said members consisting of an inner plate and an outer plate of spring metal and a pair of spaced channels extending along the plates and fixedly secured between said plates, said plates having their ends extending beyond the channels with the ends of each plate extending towards the other plate, said ends being secured in overlapping relation.

10. A spring device including a yoke, and a pair of elongated box-like spring members each having an end supported by yoke and extending therefrom in arcuately diverging relation with their convex sides confronting, each of said members consisting of an inner plate and an outer plate of spring metal and a pair of spaced channels extending along the plates and fixedly secured between said plates, said plates tapering in width to provide a wide end and a narrow end for each plate, said plates having their ends extending beyond the channels with the ends of each plate extending towards the other plate, said ends being secured in overlapping relation.

11. A spring device including a yoke, a pair of elongated box-like spring members each having an end supported by yoke and extending therefrom in arcuately diverging relation with their convex sides confronting, each of said members consisting of an inner plate and an outer plate of spring metal and a pair of spaced channels extending along the plates and fixedly secured between said plates, and an elastic cushion strip extending along the concave side of at least one of said spring members.

12. A spring device including a yoke, a pair of elongated box-like spring members each having an end supported by yoke and extending therefrom in arcuately diverging relation with their convex sides confronting, each of said members consisting of an inner plate and an outer plate of spring metal and a pair of spaced channels extending along the plates and fixedly secured between said plates, said plates tapering in width to provide a wider end and a narrow end for each plate, and an elastic cushion strip extending along the concave side of at least one of said spring members.

13. A spring device including a yoke, a pair of elongated box-like spring members each having an end supported by yoke and extending therefrom in arcuately diverging relation with their convex sides confronting, each of said members consisting of an inner plate and an outer plate of spring metal and a pair of spaced channels extending along the plates and fixedly secured between said plates, said plates having their ends extending beyond the channels with the ends of each plate extending towards the other plate, said ends being secured in overlapping relation, and an elastic cushion extending along the concave side of at least one of said spring members.

14. A spring device including a yoke, a pair of elongated box-like spring members each having an end supported by yoke and extending therefrom in arcuately diverging relation with their convex sides confronting, each of said members consisting of an inner plate and an outer plate of spring metal and a pair of spaced channels extending along the plates and fixedly secured between said plates, said plates tapering in width to provide a wide end and a narrow end for each plate, said plates having their ends extending beyond the channels with the ends of each plate extending towards the other plate, said ends being secured in overlapping relation, and an elastic cushion strip extending along the concave side of at least one of said spring members.

15. A spring device including a yoke, a pair of elongated box-like spring members each having an end supported by yoke and extending therefrom in arcuately diverging relation with their convex sides confronting, said members having the ends at the yoke in spaced relation, one of said members being fixed to the yoke and the other pivoted to said yoke to swing into and out of engagement with the fixed member, means on the yoke in the path of movement of the pivoted member away from the fixed member to limit such movement, and a hanger pivoted to said yoke.

16. A spring device including a yoke, a pair of elongated box-like spring members each having an end supported by yoke and extending therefrom in arcuately diverging relation with their convex sides confronting, each of said members consisting of an inner plate and an outer plate of spring metal and a pair of spaced channels extending along the plates and fixedly secured between said plates, said members having the ends at the yoke in spaced relation, one of said members being fixed to the yoke and the other pivoted to said yoke to swing into and out of engagement with the fixed member, means on the yoke in the path of movement of the pivoted member away from the fixed member to limit such movement, and a hanger pivoted to said yoke.

17. A spring device including a yoke, a pair of elongated box-like spring members each having an end supported by yoke and extending therefrom in arcuately diverging relation with their convex sides confronting, each of said members consisting of an inner plate and an outer plate of spring metal and a pair of spaced channels extending along the plates and fixedly secured between said plates, said plates tapering in width to provide a wide end and a narrow end for each plate, said members having the ends at the yoke in spaced relation, one of said members being fixed to the yoke and the other pivoted to said yoke to swing into and out of engagement with the fixed member, means on the yoke in the path of movement of the pivoted member away from the fixed member to limit such movement, and a hanger pivoted to said yoke.

18. A spring device including a yoke, a pair of elongated box-like spring members each having an end supported by yoke and extending therefrom in arcuately diverging relation with their convex sides confronting, each of said members consisting of an inner plate and an outer plate of spring metal and a pair of spaced channels extending along the plates and fixedly secured between said plates, said plates having their ends extending beyond the channels with the ends of each plate extending towards the other plate, said ends being secured in overlapping relation, said members having the ends at the yoke in spaced relation, one of said members being fixed to the yoke and the other pivoted to said yoke to swing into and out of engagement with the fixed member, means on the yoke in the path of movement of the pivoted member away from the fixed member to limit such movement, and a hanger pivoted to said yoke.

19. A spring device including a yoke, a pair of elongated box-like spring members each having an end supported by yoke and extending therefrom in arcuately diverging relation with their convex sides confronting, each of said members consisting of an inner plate and an outer plate of spring metal and a pair of spaced channels extending along the plates and fixedly secured between said plates, said plates tapering in width to provide a wide end and a narrow end for each plate, said plates having their ends extending beyond the channels with the ends of each plate extending towards the other plate, said ends being secured in overlapping relation, said members having the ends at the yoke in spaced relation, one of said members being fixed to the yoke and the other pivoted to said yoke to swing into and out of engagement with the fixed member, means on the yoke in the path of movement of the pivoted member away from the fixed member to limit such movement, and a hanger pivoted to said yoke.

LOUIS D. FOLEY.